US012362484B2

(12) United States Patent
Chang et al.

(10) Patent No.: US 12,362,484 B2
(45) Date of Patent: Jul. 15, 2025

(54) WIRELESS TRANSMISSION SYSTEM

(71) Applicant: BENQ CORPORATION, Taipei (TW)

(72) Inventors: Chun-Yi Chang, Taipei (TW); Chih-Ming Chen, Taipei (TW)

(73) Assignee: BenQ Corporation, Taipei (TW)

( * ) Notice: Subject to any disclaimer, the term of this patent is extended or adjusted under 35 U.S.C. 154(b) by 184 days.

(21) Appl. No.: 18/110,399

(22) Filed: Feb. 16, 2023

(65) Prior Publication Data

US 2023/0335906 A1 Oct. 19, 2023

(30) Foreign Application Priority Data

Apr. 18, 2022 (TW) ................................ 111114688

(51) Int. Cl.

*H01Q 9/04* (2006.01)
*H01Q 1/22* (2006.01)
*H01Q 1/48* (2006.01)

(52) U.S. Cl.

CPC ......... *H01Q 9/0407* (2013.01); *H01Q 1/2266* (2013.01); *H01Q 1/48* (2013.01)

(58) Field of Classification Search

CPC ...... H01Q 9/0407; H01Q 1/2266; H01Q 1/48; H01Q 1/2258; H01Q 9/40; H01Q 9/0471

See application file for complete search history.

(56) References Cited

U.S. PATENT DOCUMENTS

2012/0127039 A1* 5/2012 Tsai ......................... H01Q 1/22 343/702
2019/0281146 A1* 9/2019 Jang ....................... H01Q 21/06
2020/0312798 A1* 10/2020 Kawahata ................. G01S 7/03
2021/0359423 A1 11/2021 Huang et al.

FOREIGN PATENT DOCUMENTS

CN 104681993 A 6/2015
TW 513828 B 12/2002

OTHER PUBLICATIONS

Office action of counterpart application by Taiwan IP Office on Sep. 16, 2022.

* cited by examiner

*Primary Examiner* — David E Lotter

(57) ABSTRACT

A wireless transmission system includes a signal-transmitting device and a signal-receiving device. The signal-transmitting device is disposed in a remote-control apparatus for transmitting wireless signals wherein the remote-control apparatus is a mouse. The signal-receiving device is installed on an electronic apparatus to receive the wireless signals and trigger operations in response the wireless signals. The signal-receiving device includes a patch antenna including a dielectric substrate having a first surface and a second surface opposite to the first surface, a ground layer disposed on the first surface, and a radiating metal layer. The radiating metal layer is disposed on the second surface and includes a radiation receiving surface. A first position of the radiation receiving surface is separated from the ground layer by a first distance, and a second position of the radiation receiving surface is separated from the ground layer by a second distance less than the first distance.

13 Claims, 10 Drawing Sheets

| Antenna type | Signal receiving angles greater than 0 dBi |
|---|---|
| planar | 98 |
| D/ΔH =15 | 110 |
| D/ΔH =7.5 | 119 |

WIRELESS TRANSMISSION SYSTEM

This application claims the benefit of Taiwan application Serial No. 111114688, filed Apr. 18, 2022, the subject matter of which is incorporated herein by reference.

BACKGROUND OF THE DISCLOSURE

Field of the Disclosure

The disclosure relates in general to a control system of an electronic device, and in particular to a wireless transmission system.

Description of the Related Art

With the rapid development of wireless communication and the growing maturity of integrated circuit technology, the volume of wireless communication devices (such as, antennas) is gradually becoming lighter, thinner, shorter, and easier to carry, so that various portable electronic devices or mobile communication devices, such as notebook computers, mobile phones, tablet computers, car computers, or wearable electronic devices, that apply the wireless communication devices become more popular.

However, this may lead the antennas of various adjacent portable electronic devices or mobile communication devices interfere with each other. For example, a remote-control apparatus (such as a wireless mouse) used for operating a portable electronic device or mobile communication device (such as a notebook computer) may receive other interference signals, which may decrease the controlling reliability and responsiveness of the portable electronic device.

Therefore, there is a need to provide an advanced wireless transmission system to overcome the drawbacks of the prior art.

SUMMARY OF THE DISCLOSURE

One embodiment of the present disclosure is to provide a wireless transmission system including a signal-transmitting device and a signal-receiving device. The signal-transmitting device is disposed in a remote-control apparatus for transmitting wireless signals, wherein the remote-control apparatus is a mouse. The signal-receiving device is installed on an electronic apparatus to receive the wireless signals and trigger operations in response the wireless signals. The signal-receiving device includes a patch antenna, wherein the patch antenna includes a dielectric substrate, a ground layer, and a radiating metal layer. The dielectric substrate has a first surface and a second surface opposite to the first surface. The ground layer is disposed on the first surface. The radiating metal layer is disposed on the second surface and includes a radiation receiving surface. A first position of the radiation receiving surface is separated from the ground layer by a first distance, and a second position of the radiation receiving surface is separated from the ground layer by a second distance less than the first distance.

According to the above embodiments of the present disclosure, a wireless transmission system including a signal-transmitting device built in a remote-control apparatus and a signal-receiving device is provided, wherein the signal-receiving device includes a patch antenna and is electrically connected to a portable electronic apparatus. The patch antenna that has a radiation directivity can be selected associated with the motion range of a remote-control apparatus to receive the wireless signals provided by the signal-transmitting device. Base on the fact that the patch antenna has the characteristics of concentrated radiation field, it can prevent the portable electronic apparatus from receiving other interference signals and to enhance the signal strength received by the portable electronic apparatus. In addition, the three-dimensional structure of the radiating metal layer of the patch antenna is changed to make it have a non-planar radiation receiving surface, such that the signal-receiving angle of the patch antenna can be expanded. Therefore, the wireless communication quality between the remote-control apparatus and the portable electronic apparatus can be enhanced, and the control reliability and responsiveness of the portable electronic apparatus can be improved.

BRIEF DESCRIPTION OF THE DRAWINGS

The above and other aspects of the disclosure will become better understood with regard to the following detailed description of the preferred but non-limiting embodiment(s). The following description is made with reference to the accompanying drawings.

DETAILED DESCRIPTION OF THE DISCLOSURE

The present disclosure provides a wireless transmission system to enhance the wireless communication quality between a remote-control apparatus and a portable electronic apparatus in the same field and to improve the control reliability and responsiveness of the portable electronic apparatus. The above and other aspects of the disclosure will become better understood by the following detailed description of the preferred but non-limiting embodiment(s). The following description is made with reference to the accompanying drawings.

Several embodiments of the present disclosure are disclosed below with reference to accompanying drawings. However, the structure and contents disclosed in the embodiments are for exemplary and explanatory purposes only, and the scope of protection of the present disclosure is not limited to the embodiments. It should be noted that the present disclosure does not illustrate all possible embodiments, and anyone skilled in the technology field of the disclosure will be able to make suitable modifications or changes based on the specification disclosed below to meet actual needs without breaching the spirit of the disclosure. The present disclosure is applicable to other implementations not disclosed in the specification.

Figure 1A:
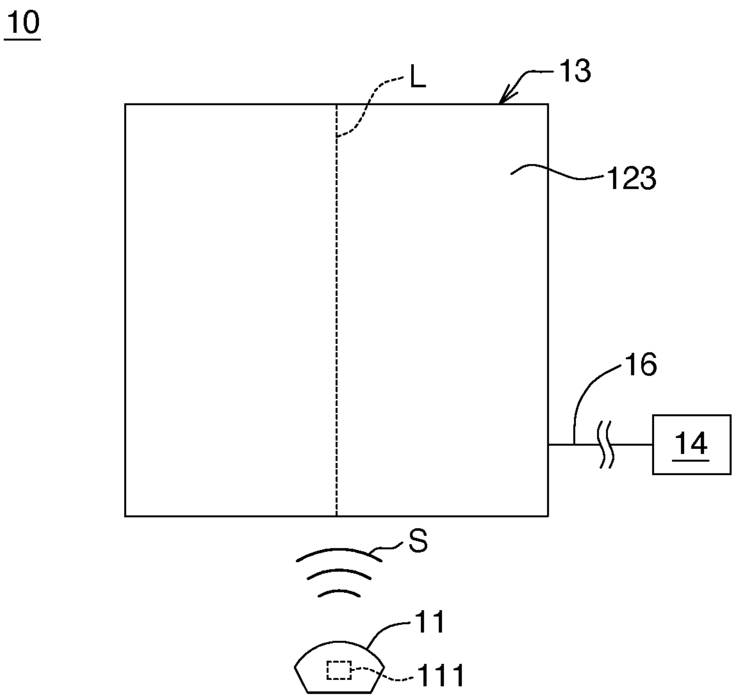
FIG. 1A is a front view illustrating the structure of a wireless transmission system according to one embodiment of the present disclosure.
Figure 1B:
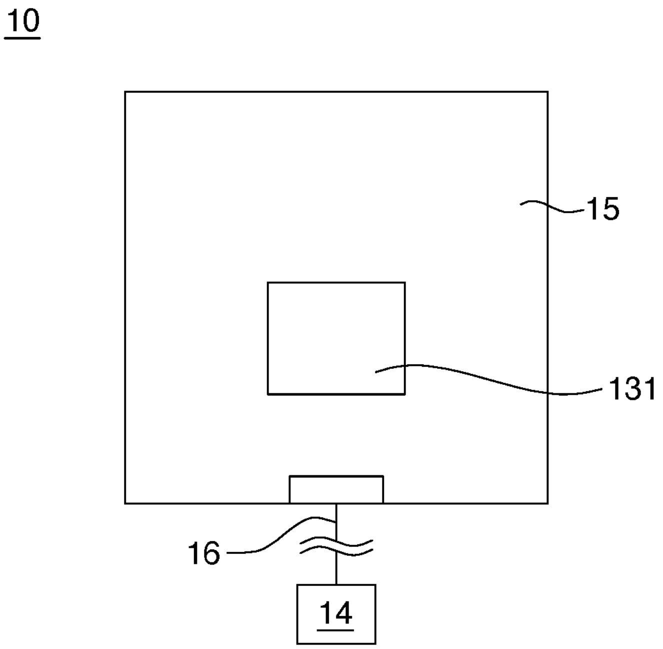
FIG. 1B is a rear view illustrating the wireless transmission system of FIG. 1A.
Figure 1C:
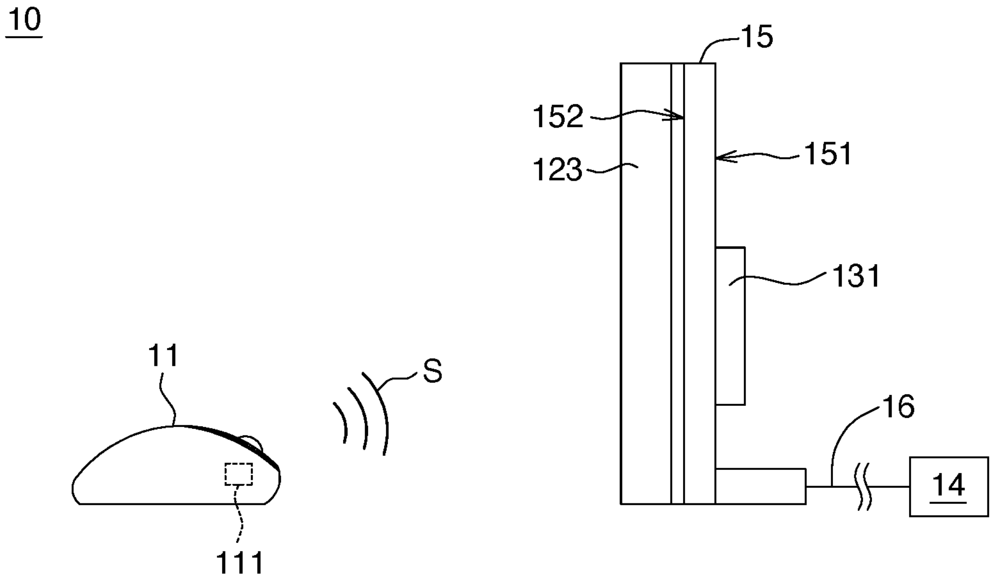
FIG. 1C is a side view illustrating the wireless transmission system of FIG. 1A.
Figure 1D:
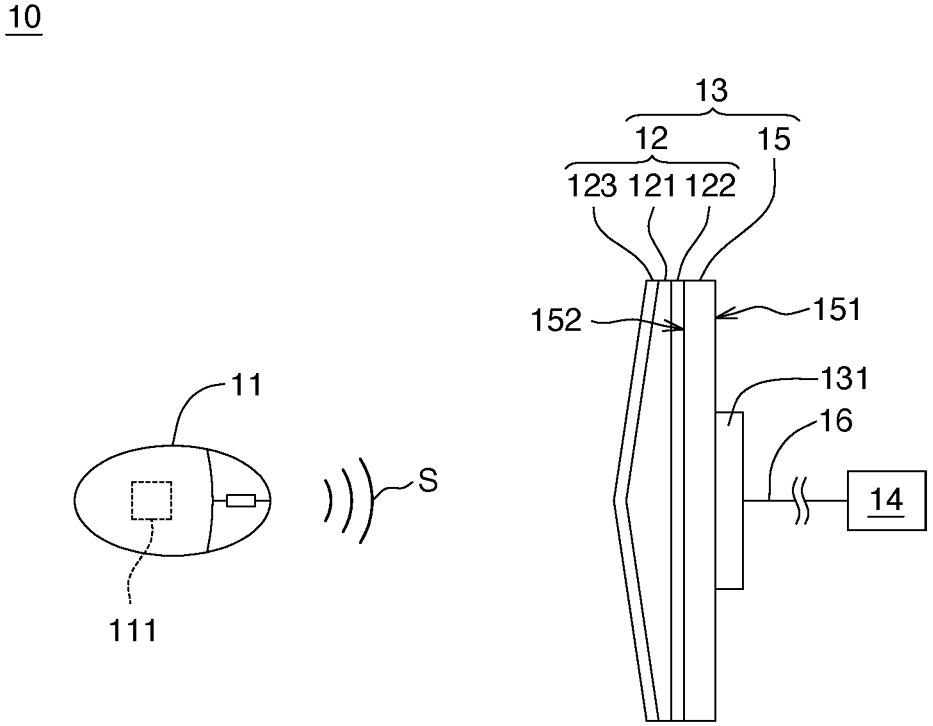
FIG. 1D is a top view illustrating the wireless transmission system of FIG. 1A.

FIG. 1A is a front view illustrating the structure of a wireless transmission system 10 according to one embodiment of the present disclosure; FIG. 1B is a rear view illustrating the wireless transmission system 10 of FIG. 1A; FIG. 1C is a side view illustrating the wireless transmission system 10 of FIG. 1A; and FIG. 1D is a top view illustrating the wireless transmission system 10 of FIG. 1A. In some embodiments of the present disclosure, the wireless transmission system 10 includes a signal-transmitting device 111 built in a remote-control apparatus 11, such as a mouse, and a signal-receiving device 13 electrically connected to a portable electronic apparatus 14. The signal-transmitting device 111 is used for transmitting wireless signals S. The signal-receiving device 13 is electrically connected with the portable electronic apparatus 14 (e.g., a laptop computer) for receiving the wireless signals S used to trigger operations and transmit the processed data of the operations to the portable electronic apparatus 14, in response to the wireless signals S.

In detail, in some embodiments of the present disclosure, the signal-receiving device 13 can be built in the portable electronic apparatus 14. When the signal-receiving device 13 receives the wireless signals S of the remote-control apparatus 11, the wireless signals S can be processed and transmitted to a central processing unit (CPU) or a graphics processing unit (Graphics Processing Unit, GPU) of the portable electronic apparatus 14 (e.g., a laptop computer) to control and trigger its operations, such as image display or data input/output etc. of the portable electronic apparatus 14. However, the configuration of the signal-receiving device 13 and the portable electronic apparatus 14 is not limited thereto.

For example, in the present embodiment the signal-receiving device 13 includes a patch antenna 12, a circuit board 15 (e.g., a printed circuit board), and a signal-receiving circuit 131. The signal-receiving device 13 and the patch antenna 12 are fixed on the circuit board 15 (the printed circuit board), and the signal-receiving circuit 131 is electrically connected to the patch antenna 12 and is externally connected to the portable electronic apparatus 14 through a connecting wire 16, such as a USB connector.

As shown in FIG. 1D, the circuit board 15 has a first surface 151 and a second surface 152 opposed to the first surface 151. The signal-receiving circuit 131 is formed on the first surface 151 of the circuit board 15. The patch antenna 12 includes a dielectric substrate 121, a ground layer 122, and a radiating metal layer 123. The ground layer 122 is attached to the second surface 152 of the circuit board 15. The dielectric substrate 121 is disposed on one side of the ground layer 122, and the ground layer 122 is disposed between the second surface 152 and the dielectric substrate 121. The radiating metal layer 123 is disposed on one side of the dielectric substrate 121 opposite to the ground layer 122, and the dielectric substrate 121 is disposed between the radiating metal layer 123 and the ground layer 122.

Figure 2:
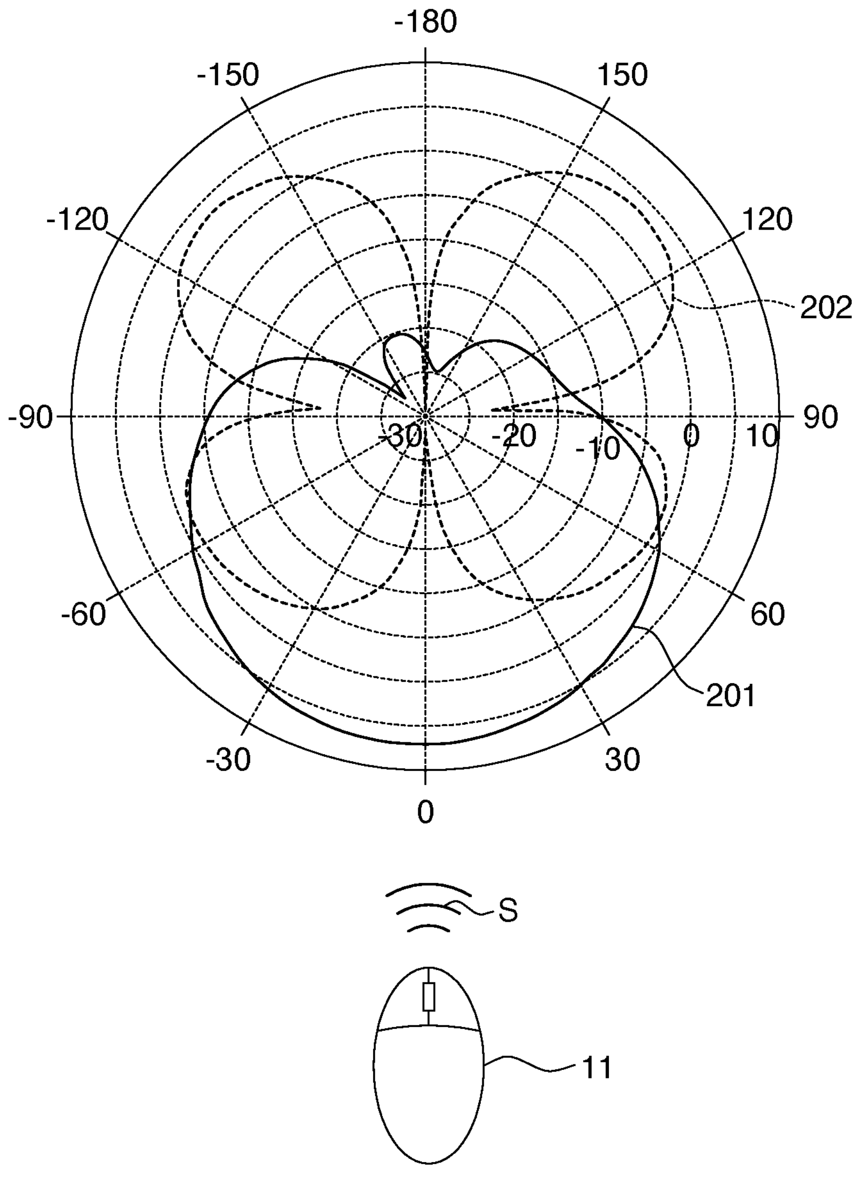
FIG. 2 are diagrams respectively illustrating two-dimensional radiation patterns of a signal-receiving device of one embodiment of the present disclosure and that of a comparative example.

Since the patch antenna 12 has a radiation directivity, when receiving the wireless signals S transmitted by the signal-transmitting device 111, thus the radiation field can be concentrated in the front, which can (in a large extent) prevent the signal-receiving device 13 from receiving other interference signals. FIG. 2 are diagrams respectively illustrating two-dimensional radiation patterns of the signal-receiving device 13 of one embodiment of the present disclosure and that of a comparative example. The remote-control apparatus 11 (e.g., a mouse) is disposed about 20 cm in front of the patch antenna 12, and the horizontal movement angle of the remote-control apparatus 11 relative to the patch antenna 12 is about 100°.

It can be seen from FIG. 2 that the radiation field 201 of the patch antenna 12 provided by the embodiment of the present disclosure can be concentrated in the direction facing to the remote-control apparatus 11 (the mouse), and it is less likely for the signal-receiving circuit 131 to receive interference signals, such as unnecessary radiation coming from other directions. On the contrary, since the monopole antenna in the comparative example has an omnidirectional radiation field 202 on the horizontal plane, thus the signal strength may be evenly distributed in 4 quadrants, and it may be not only leading the signal-receiving circuit 131 to receive unnecessary interference signals from four directions, but also leading the ability of the signal-receiving device 13 to receive signals at the direction facing to the remote-control apparatus 11 (the mouse) far inferior to that of the patch antenna 12.

Figure 3A:
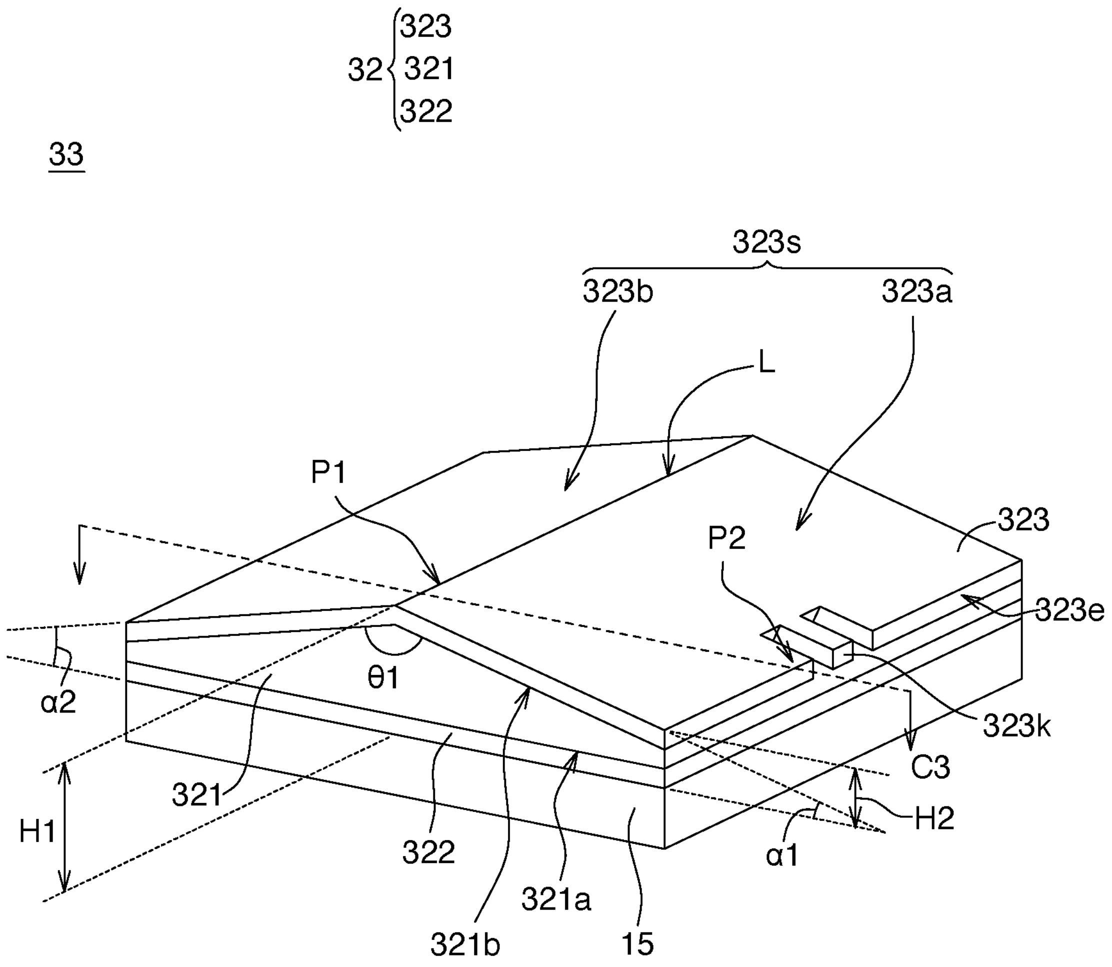
FIG. 3A is a perspective view illustrating the signal-receiving device applied in the wireless transmission system according to one embodiment of the present disclosure.
Figure 3B:
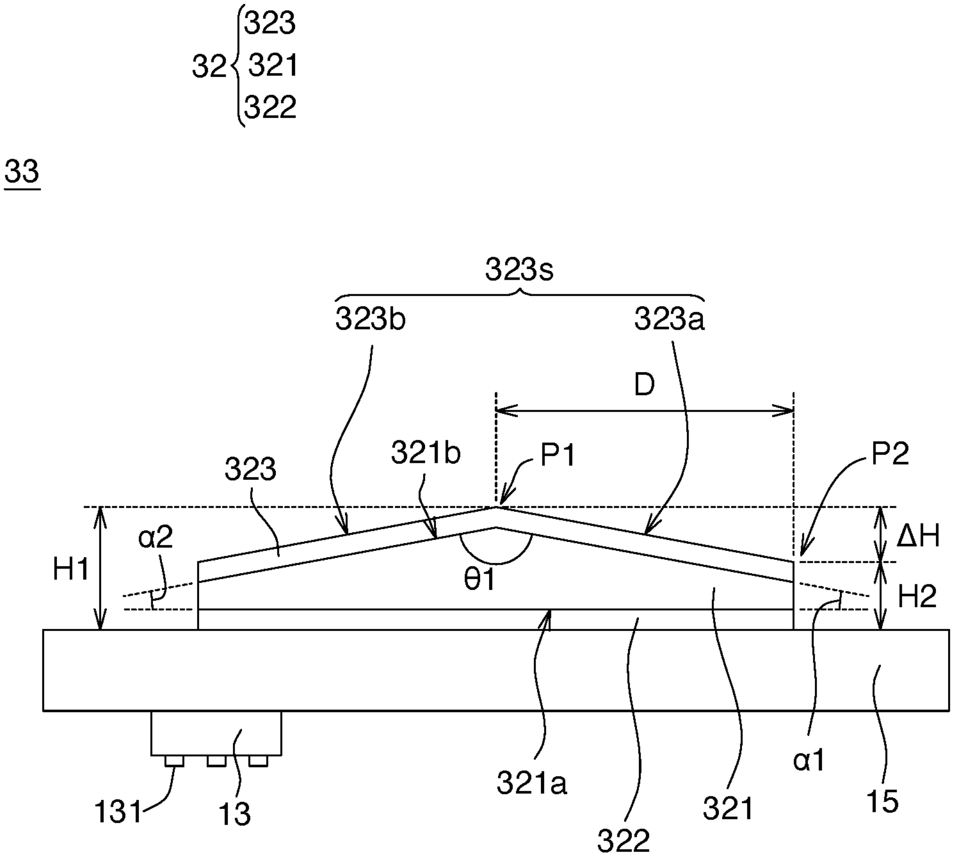
FIG. 3B is a cross-sectional view of the signal-receiving device taken along with the cutting line C3 as depicted in FIG. 3A.

FIG. 3A is a perspective view illustrating the signal-receiving device 33 applied in the wireless transmission system 10 according to one embodiment of the present disclosure; FIG. 3B is a cross-sectional view of the signal-receiving device 33 taken along with the cutting line C3 as depicted in FIG. 3A. The signal-receiving device 33 includes a circuit board 15 and a patch antenna 32 fixed on the circuit board 15. The patch antenna 32 includes a dielectric substrate 321, a ground layer 322, and a radiating metal layer 323.

In some embodiments of this specification, the dielectric substrate 321 may be, for example, a printed circuit board, a plasticized panel, or other dielectric materials. The dielectric substrate 321 has a first surface 321*a* and a second surface 321*b* on the opposite side of the first surface 321*a*. The first surface 321*a* may be a flat surface; the ground layer 322 is a flat metal layer disposed on the first surface 321*a*. In one embodiment of the present disclosure, the ground layer 322 is directly attached to the side of the circuit board 15 opposite to that for fixing a signal receiver 131 (as shown in FIG. 1B).

The radiating metal layer 323 is disposed on the second surface 321*b*, includes a radiation receiving surface 323*s*, and is electrically connected to the signal-receiving circuit 131 of the signal receiver 13. A first position P1 of the radiation receiving surface 323*s* is separated from the ground layer 322 by a first distance H1, and a second position P2 of the radiation receiving surface 323*s* is separated from the ground layer 322 by a second distance H2, wherein the first distance H1 is greater than the second distance H2.

In detail, in the present embodiment, the radiation receiving surface 323*s* includes a first sub-radiation receiving surface 323*a* and a second sub-radiation receiving surface 323*b* which are connected to each other, and these two form a non-180° angle θ1. By referencing the first surface 321*a* (flat surface), the first sub-radiation receiving surface 323*a* and the second sub-radiation receiving surface 323*b* are respectively two inclined surfaces connected to each other by a connecting line L to form a sloping roof structure covering on the first surface 321*a* (flat surface); wherein the first sub-radiation receiving surface 323*a* and the first surface 321*a* (flat surface) form a first acute angle α1; the second sub-radiation receiving surface 323*b* and the first surface 321*a* (flat surface) form a second acute angle α2.

The first position P1 and the second position P2 are located on the first sub-radiation receiving surface 323*a*; the two are separated by a third distance D in the horizontal direction (X axis), and the first distance H1 and the second distance H2 have a difference ΔH in a vertical direction (Z axis), and the ratio (D/ΔH) of the third distance D to the difference ΔH is substantially between 3 and 15. By changing the three-dimensional structure of the radiating metal layer 323, the patch antenna 32 can have a non-planar radiation receiving surface 323*s*, and the signal-receiving angle of the patch antenna 32 can be enlarged in comparison with the patch antenna having a planar radiation receiving surface. In addition, the signal-receiving angle of the patch antenna 32 can be further modulated by adjusting the ratio (D/ΔH) of the third distance D and the difference ΔH.

Figure 4:
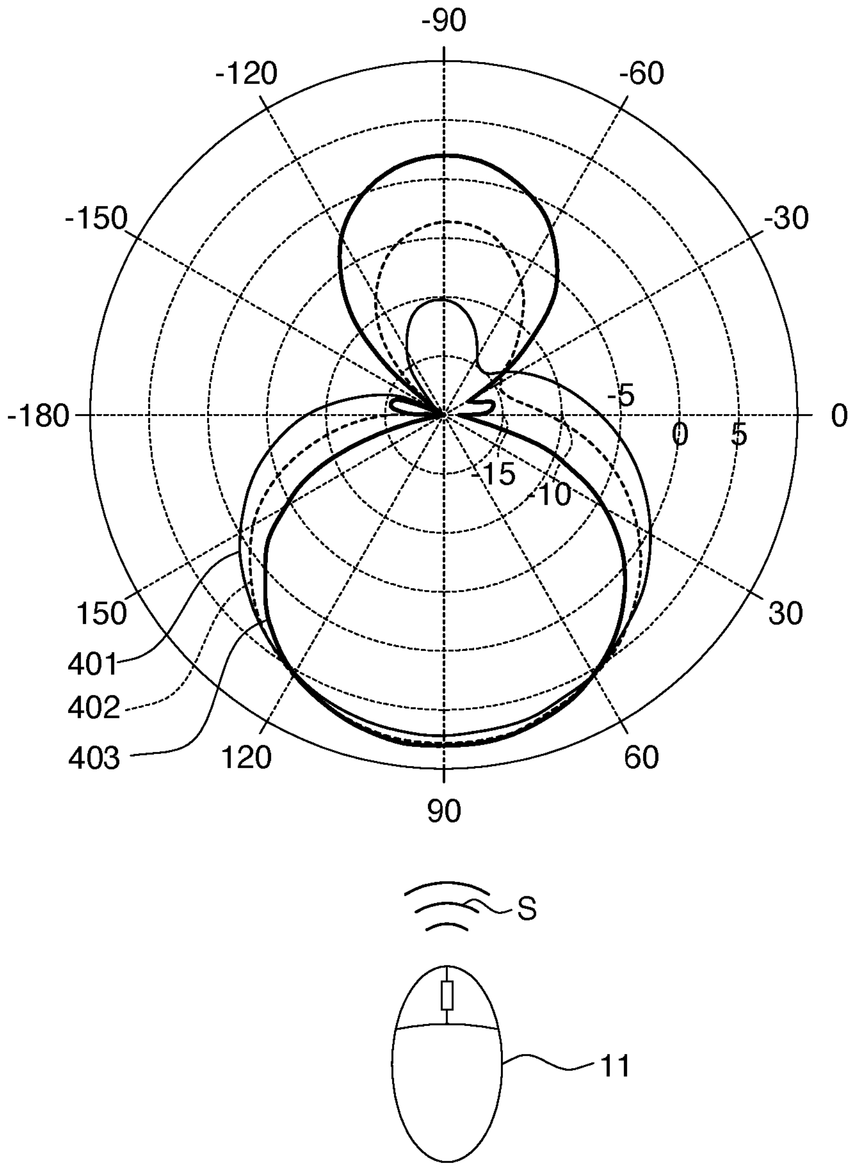
FIG. 4 are diagrams respectively illustrating two-dimensional radiation patterns of two patch antennas with different D/ΔH ratios and provided by two embodiments of the present disclosure and the two-dimensional radiation pattern of a patch antenna (comparative example) having a planar radiation receiving surface.

FIG. 4 are diagrams respectively illustrating two-dimensional radiation patterns of two patch antennas with different D/ΔH ratios and provided by two embodiments of the present disclosure and the two-dimensional radiation pattern of a patch antenna (comparative example) having a planar radiation receiving surface. It can be seen from the two-dimensional radiation patterns 401, 402 and 403 in FIG. 4 that the signal receiving-angles of the patch antennas provided by embodiments of the present disclosure with the D/ΔH ratio about 7.5 and equal to 15 are respectively 119° and 110°, and the signal receiving-angle of the planar patch antenna in the comparative example is 98°, wherein those signal receiving-angles above can receive the wireless signals in direction facing to the remote-control apparatus 11 (the mouse) with antenna gain greater than 0 dBi.

Please refer to FIG. 3A and FIG. 3B again, the radiating metal layer 323 of the patch antenna 32 may have a wire 323*k* for controlling impedance, which is connected to a feeding side 323*e* of the radiation receiving surface 323*s*; and the connecting line L of the sub-radiation receiving surface 323*a* and the second sub-radiation receiving surface 323*b* is separated from the feeding edge 323*e*. In the present embodiment, the feeding edge 323*e* and the connecting line L are parallel to each other.

However, the feeding method of the patch antenna 32 is not limited to this regard. For example, in some other embodiments, the patch antenna 32 can be electrically connected to the radiating metal layer 321, the ground layer 322 and/or other circuits (not shown) by using a coaxial inner conductor or an embedded plug (not shown) passing through the dielectric substrate 321.

After that, several function verifications of the patch antenna 32 provided by the embodiment of the present disclosure and the monopole antenna provided by the comparative example are performed to compare the received signal strength indication (RSSI) of different antennas for 8 different channels. The verification results are shown in Table 1:

TABLE 1

| Channels | 1 | 2 | 3 | 4 | 5 | 6 | 7 | 8 |
|---|---|---|---|---|---|---|---|---|
| Monopole antenna (-dB) | 100.8 | 101.3 | 100.8 | 100.9 | 101.3 | 99.9 | 100.9 | 100.3 |
| Patch antenna (-dB) | 98.3 | 99.6 | 97.6 | 98.8 | 98.8 | 97.0 | 97.7 | 97.6 |
| Difference | 2.5 | 1.7 | 3.2 | 2.1 | 2.4 | 2.9 | 3.2 | 2.7 |

It can be seen from Table 1 that no matter what channel is used, the received signal strength of the patch antenna 32 provided by the embodiments of the present disclosure is higher about 2 dB to 3 dB than that of the monopole antenna provided by the comparative example.

Subsequently, the patch antenna 32 provided by the embodiments of the present disclosure and the monopole antenna provided by the comparative example are subjected to single-frequency interference tests, in which different channel signals (2402 MHz, 2450 MHz and 2479 MHz) are used to interfere with the antennas under test from the azimuths of 0°, 90°, 180°, and 270°, and the output power of the interference signal is gradually increased from −20 dBm until frequency hopping occurs during the operation of the remote-control apparatus 11. The frequency hopping power represents the interference tolerance that the system can withstand under this condition. The larger the value represents the better the anti-interference ability. The results of the single-frequency interference tests can refer to FIG. 5.

Figure 5:
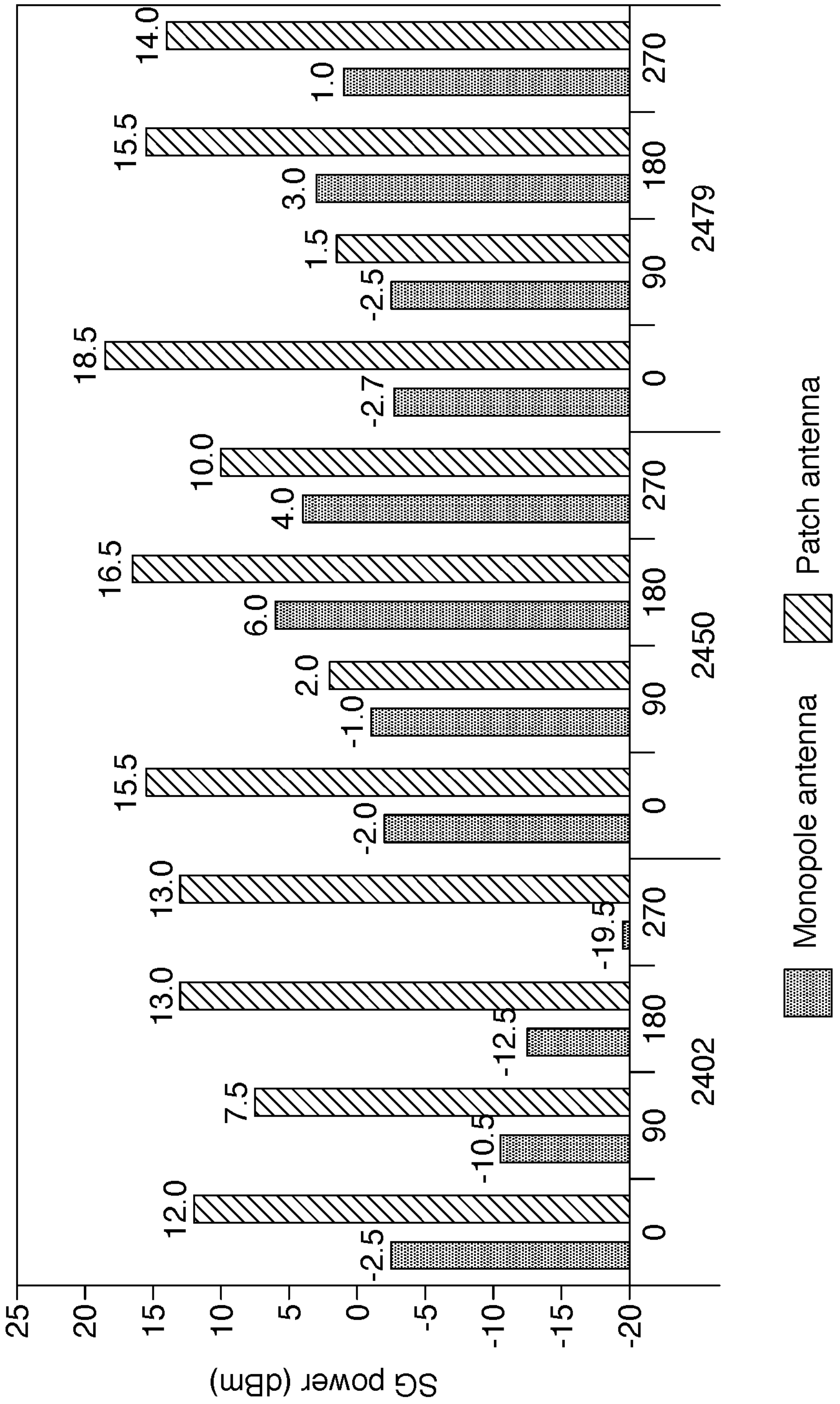
FIG. 5 is a histogram illustrating the results of single-frequency interference tests according to one embodiment of the present disclosure.

FIG. 5 is a histogram illustrating the results of single-frequency interference tests according to one embodiment of the present disclosure. It can be seen from FIG. 5 that the anti-interference ability of the patch antenna 32 provided by the embodiments of the present disclosure is significantly better than that of the monopole antenna provided by the comparative example under most conditions.

Multi-WiFi interference tests are then conducted under similar conditions. 4 wireless base stations (Access Point, AP) and 4 AP client mode (Wireless Client) are separated as far as possible to create a multi-WiFi channel environment, reduce mutual interference, and maintain the stability of WiFi transmission. Then place the remote-control apparatus 11 (for example, a mouse) on the rotating table to simulate the movement of the mouse, and test the report rate of the mouse; 30 pieces of data are collected in one test for 30 seconds, and the average value of the collected data is obtained. After completing a test, re-plug the receiver and perform the next test (the channel used may alter after re-plugging and unplugging, and it may result in different results), and repeat the test for 4 times. The results of the Multi-WiFi interference tests can refer to FIG. 6.

Figure 6:
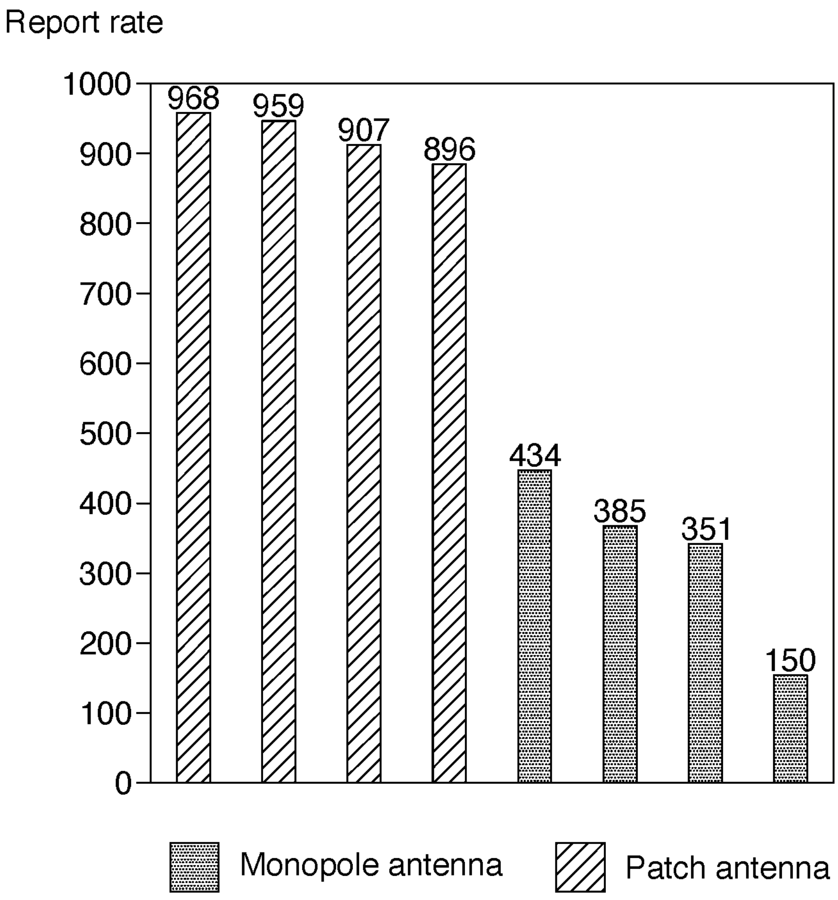
FIG. 6 is a histogram illustrating the results of multi-WiFi interference tests according to one embodiment of the present disclosure.

FIG. 6 is a histogram illustrating the results of multi-WiFi interference tests according to one embodiment of the present disclosure. The vertical axis is the number of signal reports for 1000 tests per second. It can be seen from FIG. 6 that the mouse using the patch antenna 32 provided by the embodiments of the present disclosure has higher report rate than that of the mouse using the monopole antenna provided by the comparative example.

Figure 7:
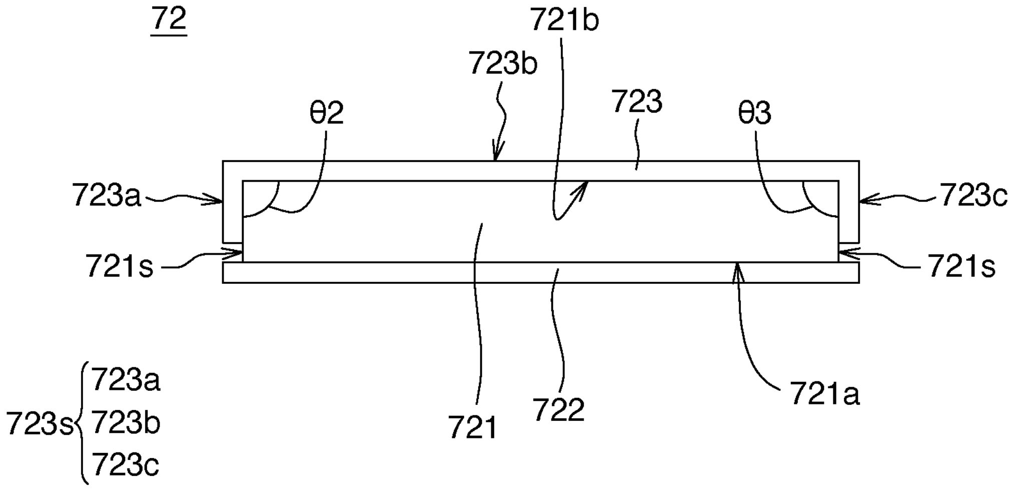
FIG. 7 is a cross-sectional view illustrating the structure of another patch antenna applied in a wireless transmission system according to another embodiment of the present specification.

However, the structure of the patch antenna is not limited to these regards. For example, FIG. 7 is a cross-sectional view illustrating the structure of another patch antenna 72 applied in the wireless transmission system 10 according to another embodiment of the present specification. The structure of the patch antenna 72 is generally similar to that of the patch antenna 32 as depicted in FIG. 3B, the difference is the sloping roof structure of the radiating metal layer 723 in the patch antenna 72.

In the present embodiment, the radiating metal layer 723 of the patch antenna 72 includes a radiation receiving surface 723*s* composed of sub-radiation receiving surfaces 723*a*, 723*b*, and 723*c*. The sub-radiation receiving surface 723*a* is connected to the sub-radiation receiving surface 723*c* through the sub-radiation receiving surface 723*b*; the sub-radiation receiving surface 723*b* and the sub-radiation receiving surface 723*a* form a non-180° angle θ2; and the sub-radiation receiving surface 723*c* and the sub-radiation receiving surface 723*b* form a non-180° angle θ3; the sub-radiation receiving surfaces 723*a*, 723*b* and 723*c* form a U/∩-shaped structure together.

The ground layer 722 is disposed on the first surface 721*a* of the dielectric substrate 721. The sub-radiation receiving surface 723*b* is disposed on the second surface 721*b* of the dielectric substrate 721 and is parallel to the first surface 721*a* of the dielectric substrate 721. The sub-radiation receiving surfaces 723*a* and 723*c* respectively cover the vertical sidewalls 721*s* on both sides of the dielectric substrate 721.

Figure 8:
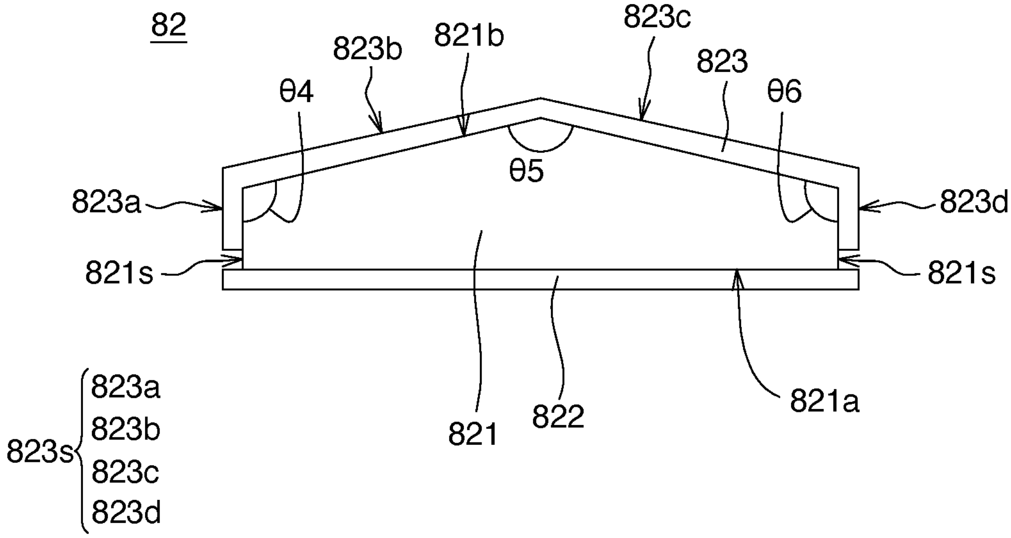
FIG. 8 is a cross-sectional view illustrating the structure of yet another patch antenna applied in a wireless transmission system according to yet another embodiment of the present specification.

FIG. 8 is a cross-sectional view illustrating the structure of yet another patch antenna 82 applied in the wireless transmission system 10 according to yet another embodiment of the present specification. The structure of the patch antenna 82 is generally similar to that of the patch antenna 72 as depicted in FIG. 7, except that the sloping roof structure of the radiating metal layer 823 in the patch antenna 82 is different from that of the patch antenna 72.

In the present embodiment, the radiating metal layer 823 of the patch antenna 82 includes a radiation receiving surface 823*s* composed of four sub-radiation receiving surfaces 823*a*, 823*b*, 823*c*, and 823*d*. The sub-radiation-receiving surfaces 823*a* and 823*d* are respectively covered on the vertical sidewalls 821*s* of the dielectric substrate 821. The sub-radiation receiving surface 823*a* is connected to the sub-radiation receiving surface 823*c* through the sub-radiation receiving surface 823*b*. The sub-radiation receiving surface 823*d* is connected to the radiation-receiving surface 823*b* through the sub-radiation-receiving surface 823*c* and isolated from the sub-radiation receiving surface 823*a*. The sub-radiation receiving surface 823*b* and the sub-radiation receiving surface 823*a* form a non-180° angle θ4; the sub-radiation receiving surface 823*b* and the sub-radiation receiving surface 823*c* forms a non-180° angle θ5; and the sub-radiation receiving surface 823*d* and the sub-radiation receiving surface 823*c* form a non-180° angle θ6.

The ground layer 822 is disposed on the first surface 821*a* of the dielectric substrate 821. The sub-radiation receiving surfaces 823*c* and 823*b* respectively cover the second surface 821*b* of the dielectric substrate 821. The sub-radiation receiving surface 823*a* and the sub-radiation receiving surface 823*d* are parallel, and respectively cover the vertical sidewalls 821*s* on both edges of the dielectric substrate 821. In the present embodiment, the second surface 821*b* of the dielectric substrate 821 is a surface with two sides inclined.

Figure 9:
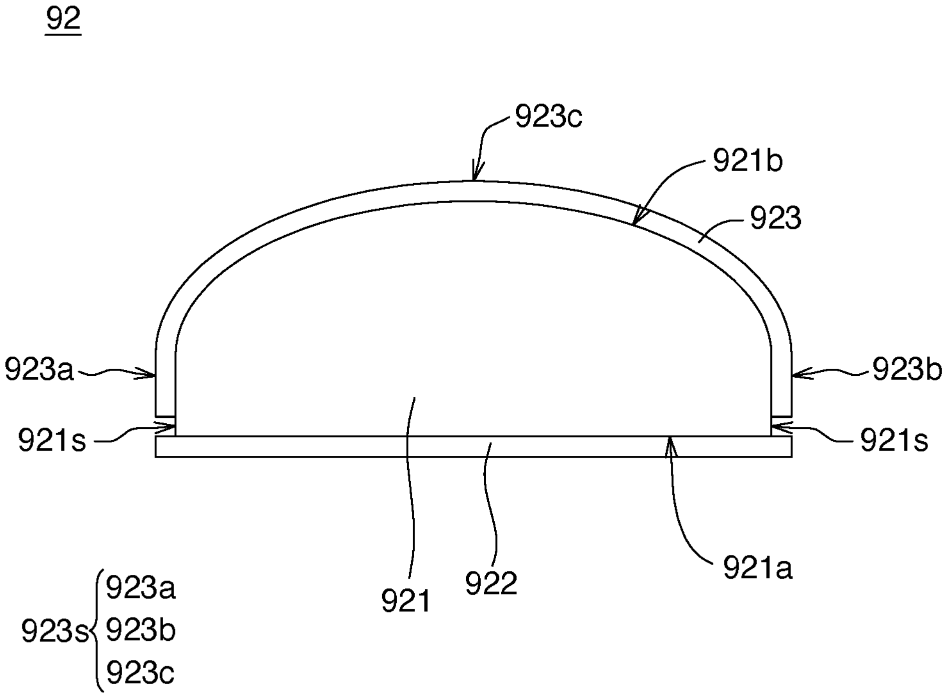
FIG. 9 is a cross-sectional view illustrating the structure of yet another patch antenna applied in a wireless transmission system according to yet another embodiment of the present specification.

FIG. 9 is a cross-sectional view illustrating the structure of yet another patch antenna 92 applied in the wireless transmission system 10 according to yet another embodiment of the present specification. The structure of the patch antenna 82 is generally similar to that of the patch antenna 72 as depicted in FIG. 7, except that the radiation receiving surface 923*s* of the radiating metal layer 923 in the patch antenna 92 includes at least one arc-shaped sub-radiation receiving surface 923*c*.

In the present embodiment, the radiation receiving surface 923*s* of the radiating metal layer 923 has a dome structure formed by an arc-shaped sub-radiation receiving surface 923*c* and two edge sub-radiation receiving surfaces 923*a* and 923*b* connected to the arc-shaped sub-radiation receiving surface 923*c*. The ground layer 922 is disposed on the first surface 921*a* of the dielectric substrate 921. The arc-shaped sub-radiation receiving surface 923*c* covers on an arc-shaped second surface 921*b* of the dielectric substrate 921. The edge sub-radiation receiving surfaces 923*a* and 923*b* are parallel, and respectively cover the vertical sidewalls 921*s* on both sides of the dielectric substrate 921.

According to the above embodiments of the present disclosure, a wireless transmission system including a signal-transmitting device built in a remote-control apparatus and a signal-receiving device is provided, wherein the signal-receiving device includes a patch antenna and is electrically connected to a portable electronic apparatus. The patch antenna that has a radiation directivity can be selected associated with the motion range of a remote-control apparatus to receive the wireless signals provided by the signal-transmitting device. Based on the fact that the patch antenna has the characteristics of concentrated radiation field, it can prevent the portable electronic apparatus from receiving other interference signals and to enhance the signal strength received by the portable electronic apparatus. In addition, the three-dimensional structure of the radiating metal layer of the patch antenna is changed to make it having a non-planar radiation receiving surface, such that the signal-receiving angle of the patch antenna can be expanded. Therefore, the wireless communication quality between the remote-control apparatus and the portable electronic apparatus can be enhanced, and the control reliability and responsiveness of the portable electronic apparatus can be improved.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wireless transmission system comprising:

a signal-transmitting device, disposed in a remote-control apparatus for transmitting wireless signals, wherein the remote-control apparatus is a mouse; and a signal-receiving device, installed on an electronic apparatus to receive the wireless signals and trigger operations in response the wireless signals, wherein the signal-receiving device comprises a patch antenna comprising:

a dielectric substrate, with a first surface and a second surface opposite to the first surface, a ground layer disposed on the first surface, and a radiating metal layer disposed on the second surface and having a radiation receiving surface, wherein a first position of the radiation receiving surface is separated from the ground layer by a first distance, a second position of the radiation receiving surface is separated from the ground layer by a second distance, and the second distance is less than the first distance;

wherein the first surface is a flat surface; the radiation receiving surface comprises a first sub-radiation receiving surface and a second sub-radiation receiving surface which are respectively two inclined surfaces, by referencing the first surface, connected to each other by a connecting line to form a sloping roof structure covering on the first surface; and the first sub-radiation receiving surface and the second sub-radiation receiving surface form a non-180°angle.

2. The wireless transmission system according to claim 1, wherein the electronic apparatus is a portable electronic device.

3. The wireless transmission system according to claim 2, wherein the signal-receiving device comprises a circuit board and a signal-receiving circuit disposed on the circuit board, and the patch antenna is fixed on the circuit board; the signal-receiving circuit is electrically connected to the radiating metal layer for receiving the wireless signals, and the wireless signals are processed and then transmitted to the portable electronic device.

4. The wireless transmission system according to claim 3, wherein the ground layer is attached to the circuit board, and the signal-receiving circuit is disposed on a side of the circuit board opposite to the ground layer.

5. The wireless transmission system according to claim 1, wherein the first sub-radiation receiving surface and the second sub-radiation receiving surface respectively form a first acute angel and a second acute angle with the first surface.

6. A wireless transmission system comprising:

a signal-transmitting device, disposed in a remote-control apparatus for transmitting wireless signals, wherein the remote-control apparatus is a mouse; and a signal-receiving device, installed on an electronic apparatus to receive the wireless signals and trigger operations in response the wireless signals, wherein the signal-receiving device comprises a patch antenna comprising:

a dielectric substrate, with a first surface and a second surface opposite to the first surface, a ground layer, disposed on the first surface, and a radiating metal layer, disposed on the second surface and having a radiation receiving surface, wherein a first position of the radiation receiving surface is separated from the ground layer by a first distance, a second position of the radiation receiving surface is separated from the ground layer by a second distance, and the second distance is less than the first distance;

wherein the first position and the second position are located on the first sub-radiation receiving surface, and the two are separated by a third distance D in a horizontal direction; the first distance and the second distance have a difference $\Delta H$ in a vertical direction, and a ratio $(D/\Delta H)$ of the third distance D to the difference $\Delta H$ is between 3 and 15.

7. A wireless transmission system comprising:

a signal-transmitting device, disposed in a remote-control apparatus for transmitting wireless signals, wherein the remote-control apparatus is a mouse; and a signal-receiving device, installed on an electronic apparatus to receive the wireless signals and trigger operations in response the wireless signals, wherein the signal-receiving device comprises a patch antenna comprising:

a dielectric substrate, with a first surface and a second surface opposite to the first surface, a ground layer, disposed on the first surface, and a radiating metal layer, disposed on the second surface and having a radiation receiving surface, wherein a first position of the radiation receiving surface is separated from the ground layer by a first distance, a second position of the radiation receiving surface is separated from the ground layer by a second distance, and the second distance is less than the first distance;

wherein the radiating metal layer comprises a wire connected to a feeding side of the radiation receiving surface for controlling impedance, and the connecting line is separated from the wire.

8. The wireless transmission system according to claim 1, wherein the radiation receiving surface further comprises a third sub-radiation receiving surface, the first sub-radiation receiving surfaces is connected to the third sub-radiation receiving surfaces through the second sub-radiation receiving surface, and the second sub-radiation receiving surface and the third sub-radiation receiving surface form a second non-180° angle.

9. The wireless transmission system according to claim 8, wherein the first sub-radiation receiving surface, the second sub-radiation receiving surface, and the third sub-radiation receiving surface form a U/N-shaped structure together.

10. The wireless transmission system according to claim 9, wherein the second sub-radiation receiving surface is parallel to the first surface.

11. The wireless transmission system according to claim 8, wherein the radiation receiving surface comprises a fourth sub-radiation receiving surface connected to the third sub-radiation receiving surface and isolated from the second sub-radiation receiving surface, and the fourth sub-radiation receiving surface and the third sub-radiation receiving surface form a fourth non-180° angle.

12. The wireless transmission system according to claim 11, wherein the first sub-radiation receiving surface and the fourth sub-radiation receiving surface are respectively located on two vertical sidewalls of the dielectric substrate, and are parallel to each other.

13. A wireless transmission system comprising:

a signal-transmitting device, disposed in a remote-control apparatus for transmitting wireless signals, wherein the remote-control apparatus is a mouse; and a signal-receiving device, installed on an electronic apparatus to receive the wireless signals and trigger operations in response the wireless signals, wherein the signal-receiving device comprises a patch antenna comprising:

a dielectric substrate, with a first surface and a second surface opposite to the first surface, a ground layer, disposed on the first surface, and a radiating metal layer, disposed on the second surface and having a radiation receiving surface, wherein a first position of the radiation receiving surface is separated from the ground layer by a first distance, a second position of the radiation receiving surface is separated from the ground layer by a second distance, and the second distance is less than the first distance;

wherein the radiation receiving surface comprises an arc-shaped sub-radiation receiving surface; and the radiation receiving surface comprises an edge sub-radiation receiving surface connected to the arc-shaped sub-radiation receiving surface and disposed on a vertical sidewall of the dielectric substrate.

* * * * *